United States Patent [19]

Cameron

[11] Patent Number: 4,798,399
[45] Date of Patent: Jan. 17, 1989

[54] COMBINATION SAFETY CAGE FOR ALL TERRAIN VEHICLE

[76] Inventor: William M. Cameron, Rte. 4, Box 320, Florence, S.C. 29501

[21] Appl. No.: 182,415

[22] Filed: Apr. 18, 1988

[51] Int. Cl.⁴ .................. B60R 22/00; B60R 27/00
[52] U.S. Cl. .......................... 280/756; 280/289 G; 280/801; 280/748; 297/466
[58] Field of Search ............. 280/756, 755, 727, 748, 280/289 G, 801; 297/465, 466; 296/187, 1 R, 24 R, 210

[56] References Cited

U.S. PATENT DOCUMENTS

| | | | |
|---|---|---|---|
| 1,473,956 | 11/1923 | Eyre et al. | 280/756 |
| 2,783,056 | 2/1957 | Belk | 280/756 |
| 2,810,489 | 10/1957 | Davies | 280/756 |
| 2,921,799 | 1/1960 | Hatten | 280/756 |
| 3,363,934 | 1/1968 | Peters | 280/748 |
| 3,497,090 | 2/1970 | Daniels | 280/756 |
| 3,502,368 | 3/1970 | Maxa | 280/748 |
| 3,622,177 | 11/1971 | Notestline | 280/756 |
| 4,640,527 | 2/1987 | Taylor | 280/756 |
| 4,673,190 | 6/1987 | Ahlberg | 280/756 |

*Primary Examiner*—Richard A. Bertsch
*Attorney, Agent, or Firm*—Walter F. Wessendorf, Jr.

[57] ABSTRACT

A combination safety cage, for use with an all terrain vehicle (ATV), and whose superstructure has side and head rails, wheel guards, horizontal rails, top overhead rails, rear horizontal rails and laterally projecting rails of tubular construction and with outward radius curves. A heavy bottom plate provides operational stability for the ATV. A seat belt harnesses the driver to the ATV seat. The combination safety cage prevents the driver from putting his foot on the ground while the ATV is moving. The driver is contained and kept within the safety cage, protected from injury, regardless of what direction the ATV overturns or rolls over, and the driver is further protected if the ATV collides with a fixed object.

4 Claims, 2 Drawing Sheets

COMBINATION SAFETY CAGE FOR ALL TERRAIN VEHICLE

BACKGROUND OF THE INVENTION

1. Technical Field

This invention relates to a combination safety cage for an all terrain vehicle (ATV) to contain and keep the driver totally within the safety cage in the event the ATV overturns or rolls over and thereby to prevent the driver from being thrown out of the ATV, and to prevent the driver, or any part of his body, from being injured.

2. Background

Some 9 million ATV's have been sold in the United States. Young people, especially, who operate ATV's have sustained serious bodily injuries, in part, because of their lack of driving skill, inexperience and inability to properly operate and control the ATV's. Another part of the reason is the fact that ATV's have some operational instability. When an ATV overturns or rolls over, the driver is thrown or snatched out of his ATV to the ground, pinned or crushed beneath the vehicle. When an ATV is overturning laterally to the left or right, the driver, by instinct, will put his respective left or right foot on the ground in an attempt to "right" the ATV. By doing so, the driver's left or right foot will be in direct line with the corresponding left or right rear wheel of the ATV and, hence, will be caught beneath such corresponding left or right rear wheel causing the driver to be snatched from the vehicle and crushed beneath the vehicle, resulting in the driver's death or his sustaining serious bodily injuries.

The problems in the art to which this invention appertains are the need to render it physically impossible for the driver to put his foot on the ground while operating the ATV, the need to prevent the driver from being thrown out of the ATV in the event of a turnover or roll over, the need to totally contain and keep the driver in the ATV regardless of turnover or roll over, the need to totally protect the driver whether his ATV overturns laterally to the left or right, whether the ATV rolls over or turns over in whatever direction, and the need to improve the operational stability of the ATV.

SUMMARY OF THE INVENTION

The objects of the invention are to contribute to the solution of the discussed problems of the art by providing a tubular cage, made of steel, other metal, plastic or other suitable material, affixed to a heavy transversely disposed bottom plate and to the ATV's support structure. The heavy bottom plate lowers the center of gravity and improves the operational stability of the ATV. The tubular cage and bottom plate physically prevent a driver from ever putting his foot on the ground, while operating the ATV, in the event the ATV overturns or rolls over. A seat belt is carried by the cage and cooperates to contain and keep the driver in the cage regardless of whatever direction the ATV turns over or rolls over, and to protect the driver from sustaining injury whatever non-piercing object the ATV strikes and with the superstructured cage receiving the impact.

BRIEF DESCRIPTION OF THE DRAWINGS

These objects and other objects of the invention should be discerned and appreciated by the DESCRIPTION OF THE PREFERRED EMBODIMENT in conjunction with the drawings, wherein like reference numerals refer to similar parts throughout the several views, in which.

DESCRIPTION OF THE PREFERRED EMBODIMENT

Figure 1:
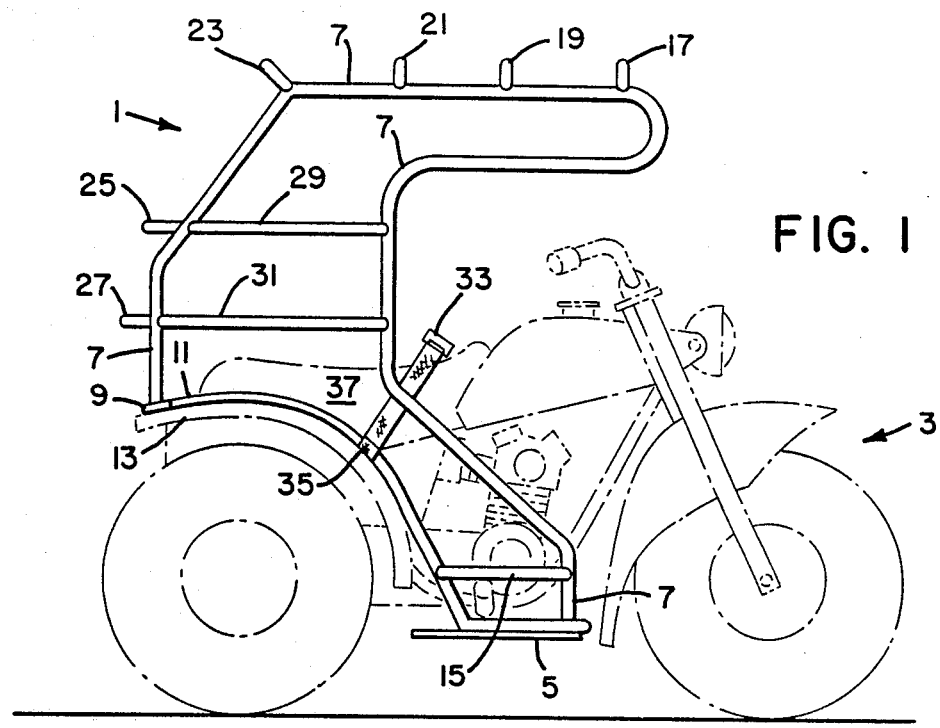
FIG. 1 is a side elevational view of the safety cage mounted on an ATV shown in phantom lines.
Figure 2:
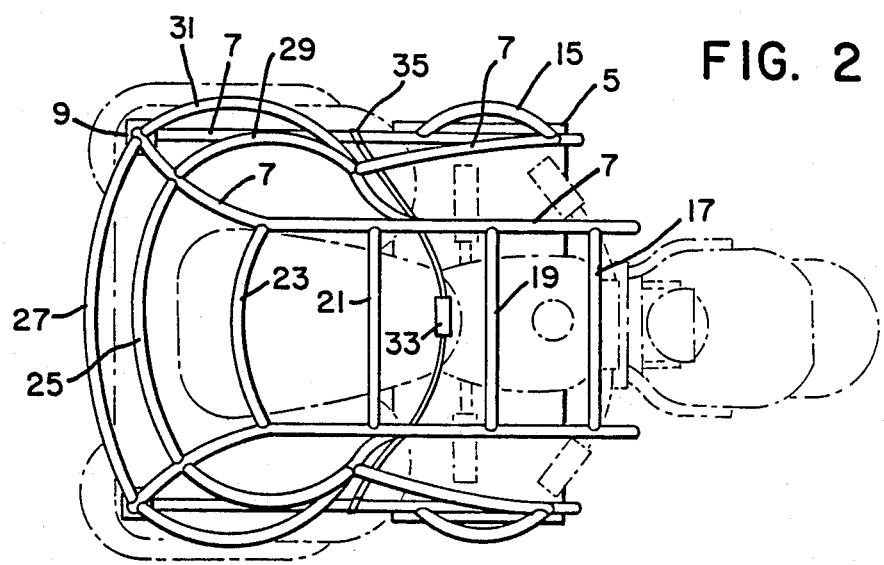
FIG. 2 is a top plan view of the invention.
Figure 3:
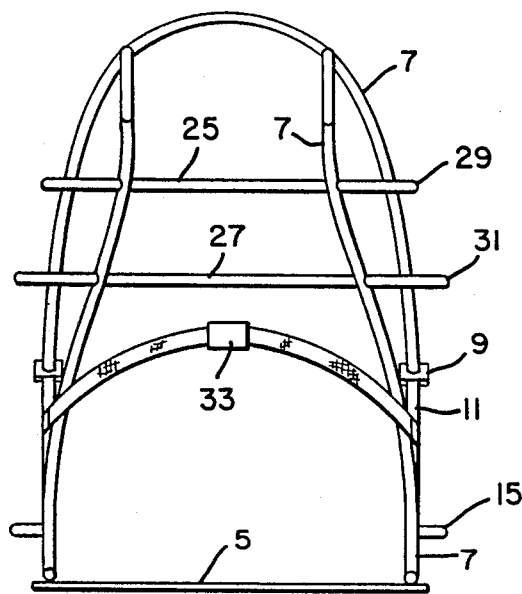
FIG. 3 is a front view.
Figure 4:
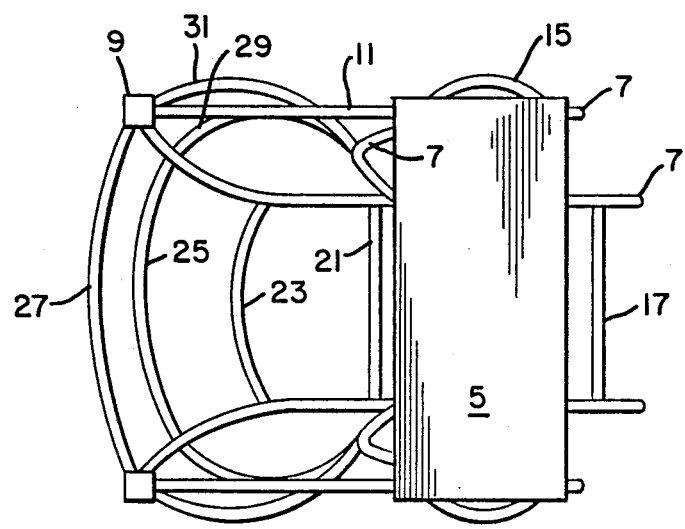
FIG. 4 is a bottom view.

In FIG. 1 of the drawings, reference numeral 1 generally refers to the combination safety cage invention shown mounted, is fixed relationship, on an all terrain vehicle (ATV) shown in phantom lines and generally referred to by reference numeral 3. Safety cage 1 has a heavy flat bottom plate 5, disposed in transverse relationship with respect to the ATV 3 and fixedly secured to support structure of the ATV 3 in any appropriate manner, such as by bolting or welding same to the ATV's support structure. The safety cage 1 has tubular side and head rails that are serpentine-shaped, as shown, and have upstanding front portions, top-most portions, and downwardly depending rearward portions. The upstanding portions of the tubular side and head rails 7 are fixed to plate 5 and are upstanding therefrom. Support plates 9, suitably fixed to the ATV's support structure, carry rearwardly curved wheel guards 11 integral with the side and head rails 7. The tubular wheel guards 11 extend rearwardly relative to the fenders 13 of the ATV 3. Disposed parallel with respect to heavy bottom plate 5 and suitably fixed to the side and head rails 7 and to the tubular wheel guards 11, are tubular horizontal rails 15. Heavy plate 5 functions to significantly lower the center of gravity of the ATV 3 to improve its operational stability. Plate 5, together with rails 7, wheel guards 11 and rails 15, in the immediate regions defined by the plate 5 and rails 15, function to render it physically impossible for the driver to put one of his feet on the ground while operating the ATV 3. It should be noted that the tubing members forming the cage 1 have outward radius curves for additional strength and structural rigidity. Suitably fixed to the top-most portions of the rails 7 are the top overhead tubular rails 17, 19, 21 and 23, and whose outward radius curves and lattice-like arrangement and disposition function to materially provide strength and structural rigidity to cage 1 in protecting the ATV driver regardless of what direction the ATV 3 turns over or rolls over. For the further protection and safety of the ATV driver, the rearward portions of the rails 7, downwardly depending from the top-most portions of rails 7, fixedly carry therebetween horizontal tubular rails 25 and 27; and rails 25 and 27, with their outward radius curves, impart further strength and structural rigidity to safety cage 1. The upstanding front portions of the rails 7 and the downwardly depending rearward portions of the rails 7 fixedly carry therebetween laterally projecting horizontal tubular rails 29 and 31; and rails 29 and 31, with their outward radius curves, impart still further strength and structural rigidity to safety cage 1. In addition to the tubular rails 25 and 27 protecting the ATV driver from impacts to the rear of the safety cage 1 in the event the ATV rolls over, turns over or collides with a fixed object, such as a tree, huge rock, etc. The laterally projecting rails 29 and 31 similarly protect the ATV driver from impacts to the sides of the safety cage 1; and the top overhead rails 17, 19, 21 and 23 protect the ATV from impacts to the top of the safety cage 1. A seat belt 33, whose remote ends 35 are suitably fixed to the wheel guards 11, harnesses the ATV driver to his seat 37, thereby containing and keeping the ATV driver within the surrounding protection provided by the combination safety cage 1.

Having thusly described my invention, I claim:

1. A combination safety cage for attachment to support structure of and for use with an all terrain vehicle (ATV) to contain and keep the driver of the ATV physically and totally within said safety cage, to prevent the driver, in the event the ATV overturns or rolls over, from being thrown out of the ATV, to prevent the driver from sustaining bodily injury regardless of the direction the ATV overturns or rolls over, or in the event the ATV collides with a fixed object, to physically prevent the driver from putting either of his feet on the ground to get caught by a moving rear wheel of the moving ATV, and to lower the center of gravity of the ATV to improve its operational stability; said combination safety cage comprising a heavy bottom plate, side and head rails, wheel guards, horizontal rails, top overhead rails, rear horizontal rails, laterally projecting rails and a seat belt; said heavy bottom plate being disposed in transverse relationship with respect to said ATV, said heavy bottom plate lowering the center of gravity of said ATV to improve its operational stability, said side and head rails being serpentine-shaped, and having front portions, top-most portions and rearward portions, said front portions of said side and head rails being upstanding from said bottom plate, said top-most portions of said side and head rails extending rearwardly from said upstanding front portions of said side and head rails, said rearward portions of said side and head rails depending downwardly from said top-most portions of said side and head rails, said ATV having rear-wheel fenders, said wheel guards extending rearwardly from said side and head rails, and over said ATV's rear-wheel fenders, said upstanding front portions of said side and head rails and said wheel guards carrying therebetween said horizontal rails, said topmost portions of said side and head rails carrying said top overhead rails therebetween, said downwardly depending rearward portions of said side and head rails carrying said rear horizontal rails therebetween, said downwardly depending rearward portions of said side and head rails and said upstanding front portions of said side and head rails carrying said laterally projecting rails therebetween, said bottom plate, upstanding front portions of said side and head rails, wheel guards and horizontal rails physically preventing the ATV driver from putting of his feet on the ground to get caught by a moving rear wheel of said moving ATV, said ATV having a seat, said seat belt having remote ends, said safety cage carrying said seat-belt remote ends, said seat belt harnessing the driver to said ATV seat to contain and keep the driver physically and totally within said safety cage to prevent the driver, in the event the moving ATV overturns or rolls over, from being thrown out of the ATV, to protect the driver from bodily injury regardless of the direction in which the ATV overturns or rolls over, and to protect the driver in the event the ATV collides with a fixed object.

2. A combination safety cage in accordance with claim 1, wherein said side and head rails, wheel guards, horizontal rails, top overhead rails, rear horizontal rails and laterally projecting rails are arranged and disposed lattice-like to impart strength and structural rigidity to the safety cage.

3. A combination safety cage in accordance with claim 1, wherein said side and head rails, wheel guards, horizontal rails, top overhead rails, rear horizontal rails and laterally projecting rails are of tubular construction.

4. A combination safety cage in accordance with claim 1, wherein said side and head rails, wheel guards, horizontal rails, top overhead rails, rear horizontal rails and laterally projecting rails have outward radius curves.

* * * * *